Figure 11:
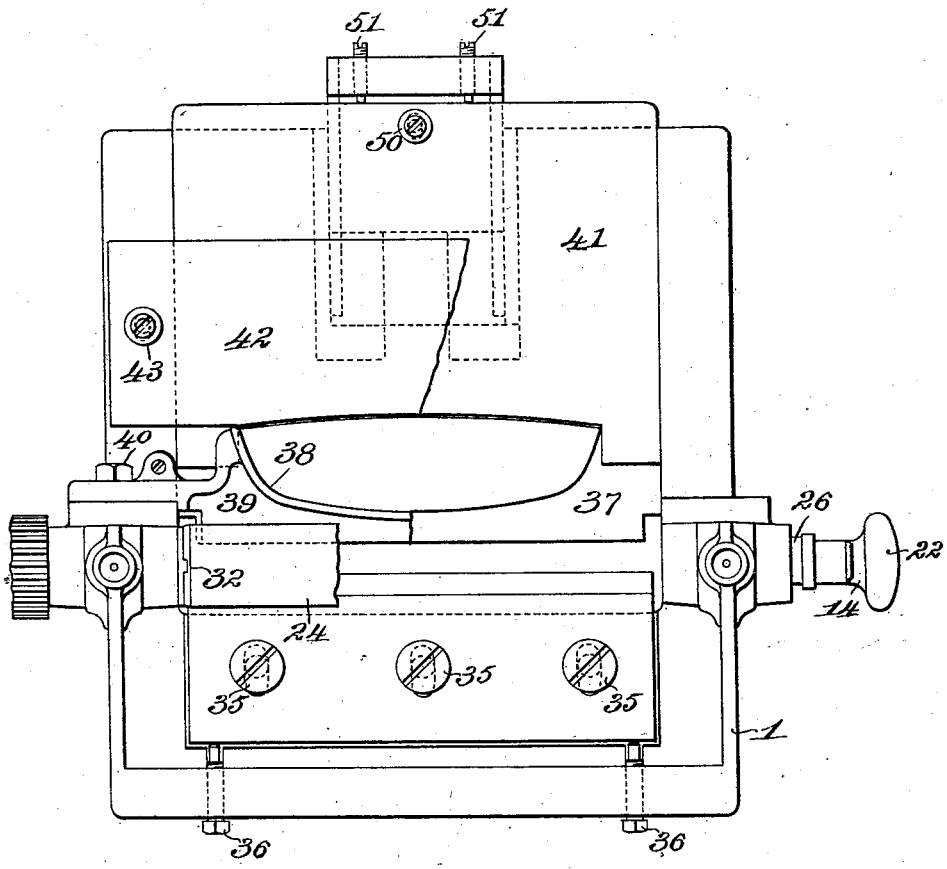

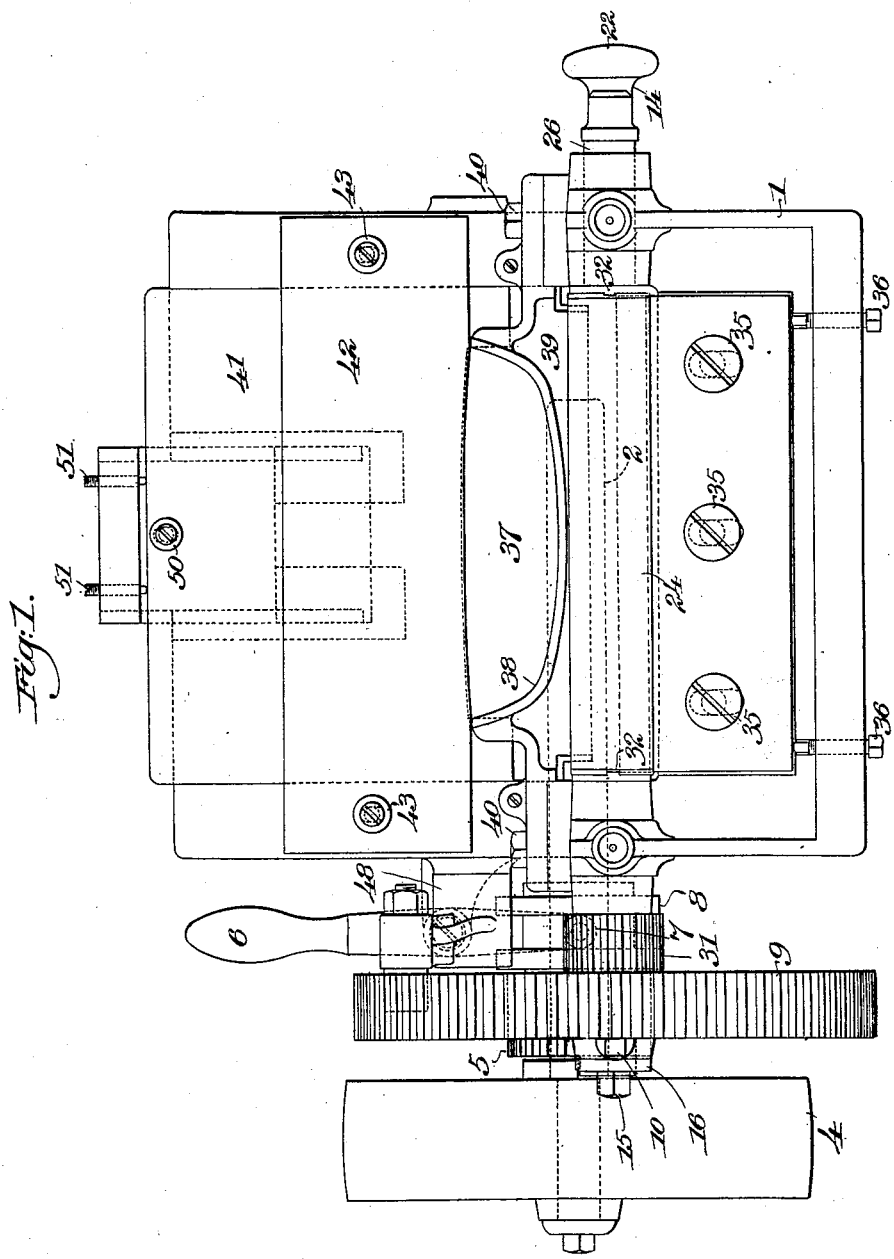

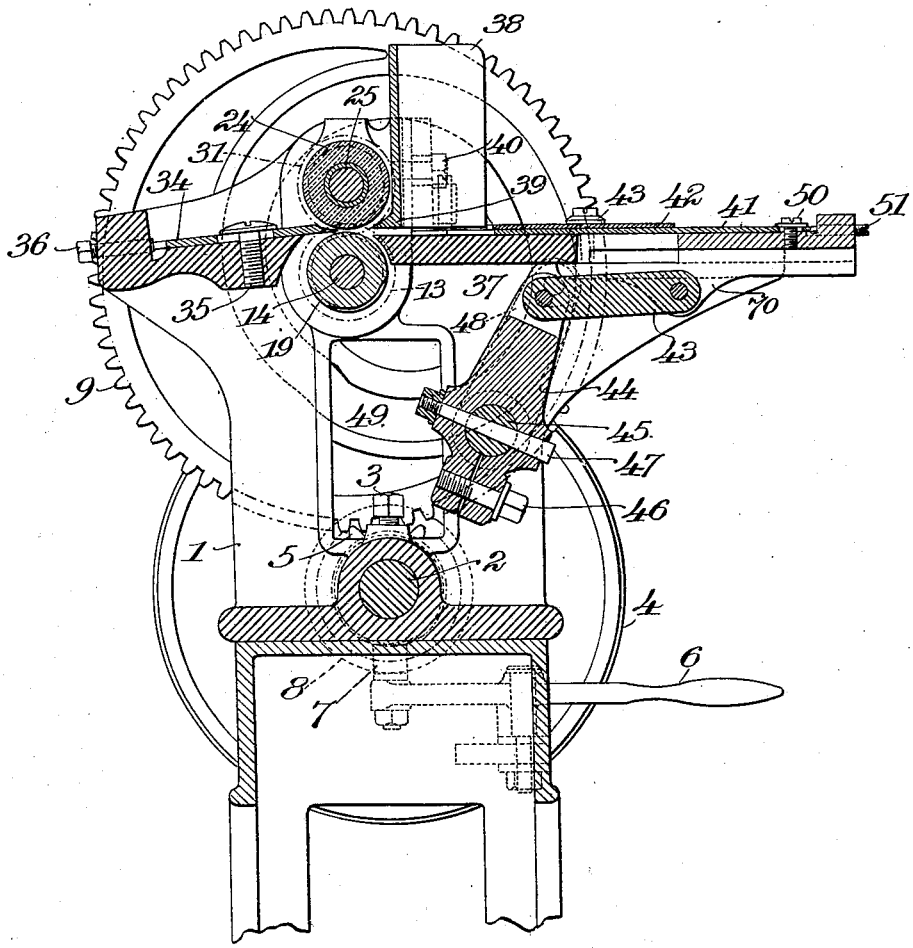

No. 703,617. Patented July 1, 1902.
J. R. SCOTT.
COUNTER SKIVING MACHINE.
(Application filed Sept. 21, 1900. Renewed Oct. 5, 1901.)
(No Model.)
5 Sheets—Sheet 3.
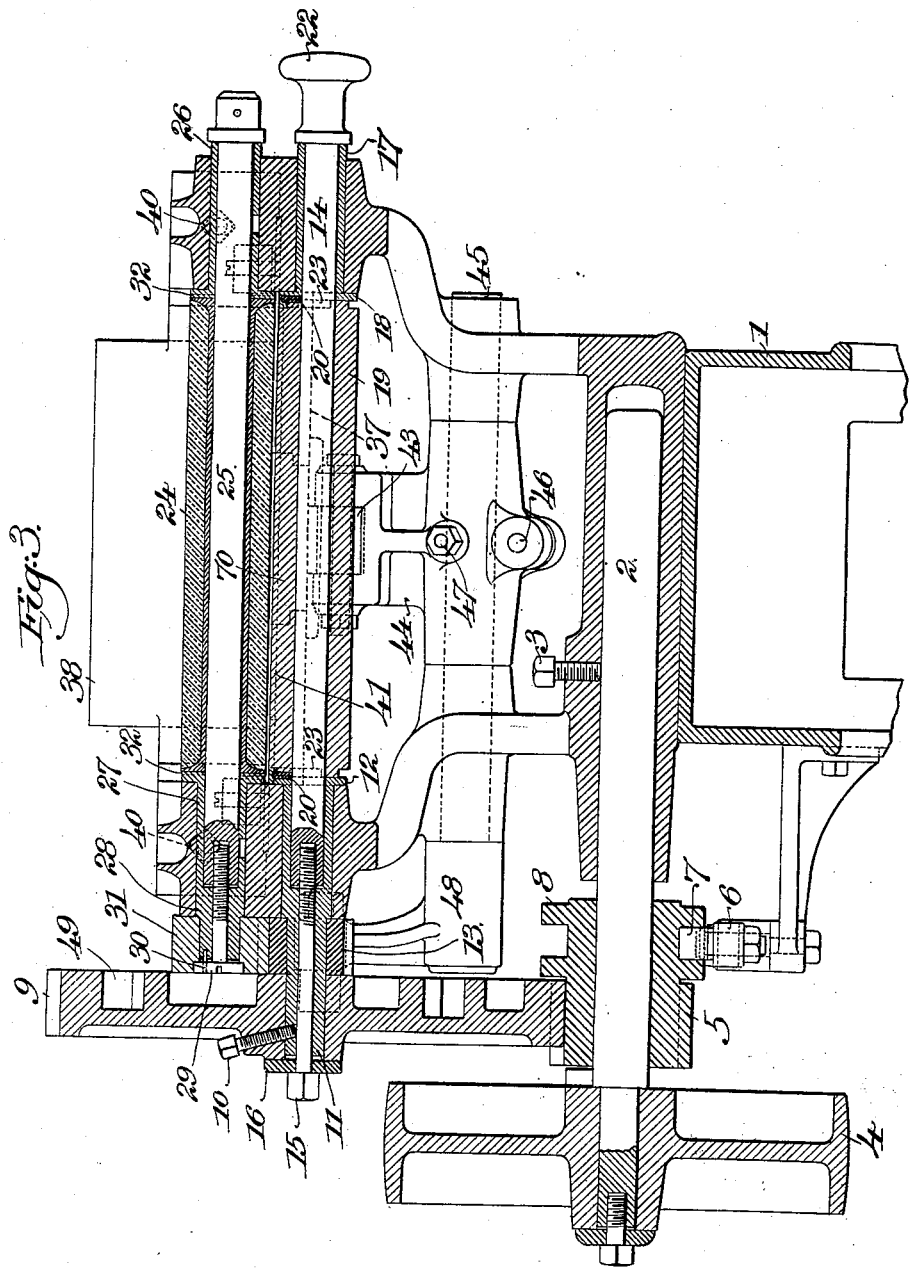

No. 703,617. Patented July 1, 1902.
J. R. SCOTT.
COUNTER SKIVING MACHINE.
(Application filed Sept. 21, 1900. Renewed Oct. 5, 1901.)
(No Model.) 5 Sheets—Sheet 4.
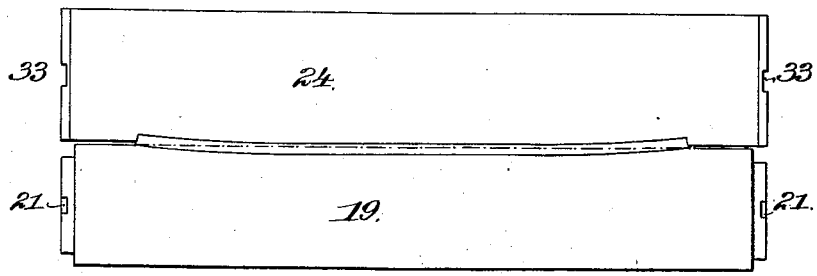
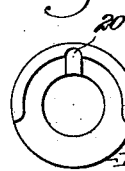 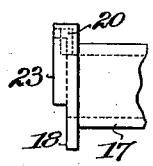 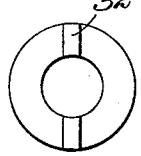 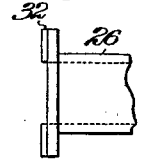
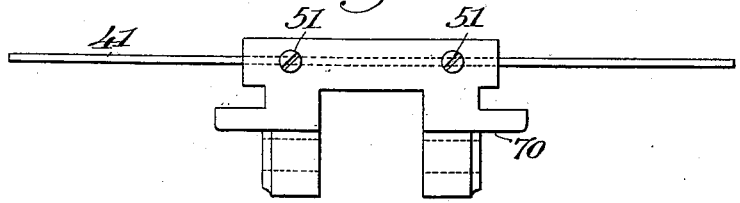
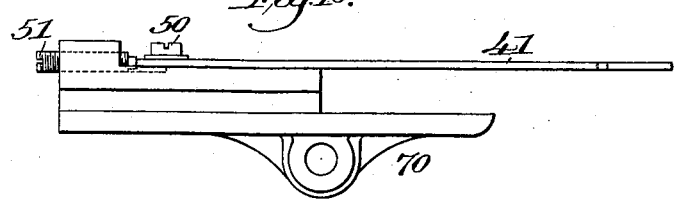
Witnesses: Inventor:
Jacob R. Scott
by his Attorney
Benjamin Phillips No. 703,617. Patented July 1, 1902.
J. R. SCOTT.
COUNTER SKIVING MACHINE.
(Application filed Sept. 21, 1900. Renewed Oct. 5, 1901.)
(No Model.) 5 Sheets—Sheet 5.

Witnesses.
Edward S. Day
Fred O. Fish

Inventor
Jacob R. Scott
by his Attorney
Benjamin Phillips

UNITED STATES PATENT OFFICE.

JACOB R. SCOTT, OF BOSTON, MASSACHUSETTS, ASSIGNOR TO UNITED SHOE MACHINERY COMPANY, OF PATERSON, NEW JERSEY, A CORPORATION OF NEW JERSEY.

COUNTER-SKIVING MACHINE.

SPECIFICATION forming part of Letters Patent No. 703,617, dated July 1, 1902.

Application filed September 21, 1900. Renewed October 5, 1901. Serial No. 77,728. (No model.)

*To all whom it may concern:*

Be it known that I, JACOB R. SCOTT, a citizen of the United States, residing at Boston, in the county of Suffolk and State of Massachusetts, have invented certain new and useful Improvements in Counter-Skiving Machines; and I do hereby declare the following to be a full, clear, and exact description of the invention, such as will enable others skilled in the art to which it appertains to make and use the same.

This invention relates to leather-skiving machines, and more particularly to machines for skiving counters of boots and shoes.

A boot or shoe counter consists of a relatively long and narrow piece of sole-leather, the central portion of which is thick enough to give the required stiffness to the heel portion of the shoe-upper and the edges of which are skived off to a thin or feather edge to avoid projections on the inside of the shoe and to permit the lower edge of the counter to be folded over the heel of the sole when the upper is lasted. For the best effects the counter should be of a certain definite length for a shoe of a certain style and size, and the upper edge of the counter—that is, the edge which is uppermost when the counter is in position in the shoe—and the ends should be skived off in a regular manner to a certain thinness. If the counter is too long, it will not fit the shoe, but the ends will project beyond the heel portion and interfere with the fit and appearance of the shoe, and if the upper edge or ends are either too thick or too thin the counter will be too stiff or too flimsy, an imperfect shoe resulting in either case. Moreover, if the edges of the counter are not skived uniformly portions of the counter will be weakened, and the counter will not properly support the heel when the shoe is worn.

Many attempts have been made to provide a machine for producing boot and shoe counters having the characteristics enumerated above as being desirable. So far as I am aware, however, no machine has heretofore been devised by which counters even approximating perfection could be produced. In all machines with which I am acquainted the product is not uniform, many of the counters produced being unfit for use and many others requiring a subsequent hand treatment to adapt them for use.

The object of my invention is, then, to provide a machine by which counters of a certain definite length and with their upper edges and ends skived off regularly to a certain thinness may be produced in a uniform and reliable manner.

In carrying out my invention I provide a die-roller having a die corresponding in shape to the counter to be produced, a pressure-roller or other suitable pressure device for forcing the counter-blank into the die, and a skiving-knife for skiving the blank while in the die. This general arrangement has heretofore been employed in counter-skiving machines; but in all such machines with which I am familiar the die has been arranged transversely to the axis of the roll. The result of this arrangement has been that the counter is stretched more or less in passing through the rolls, the amount of stretch depending upon the character and condition of the stock. The blanks for the counter are ordinarily cut from the side of leather so as to stretch more readily endwise than sidewise to allow the counter to stretch with the upper during the operation of lasting. For this and other reasons the blank is often stretched three-fourths of an inch or more during the skiving operation. Moreover, in order to accommodate the die the die-roller is necessarily made large, so that the cutting edge of the skiving-knife has to be placed at some distance from the line of contact of the die and pressure rolls. The result of this is that the blank rises from the die before reaching the knife, and an imperfect counter is produced. The stretching of the blank also results in a counter which is not skived alike at both ends, as the rear end of the blank does not register with the die and is consequently skived to a long thin edge. Another disadvantage incident to a construction in which the die is arranged transversely to the axis of the roll is that the blank in passing between the die-roller and pressure device must be bent considerably in being forced into the die. For this reason the pressure device often fails to force the blank to the bottom of the die, and as a consequence the blank is not properly presented to the skiving-knife. To overcome these difficulties, I arrange the die longitudinally of the die-roller and feed the blank to the die-roller and pressure device sidewise, with the side which forms the upper edge of the counter in advance. By this arrangement I avoid the longitudinal stretching of the blank incident to prior constructions and at the same time am enabled to use a die-roller of small diameter, so that the cutting edge of the skiving-knife can be placed nearly over the center of the roller close to the line of contact. Moreover, as the die-roller is of small diameter and the die is disposed longitudinally of the roller the blank must be bent very little to conform to the die, in practice the blank dropping into the die by its own weight and being held firmly seated against the bottom of the die by the pressure device. The stretching of the blank transversely is inappreciable; but in any event the harmful effects of such stretching are obviated by feeding the blank to the die-roller and pressure device with the side which forms the upper edge of the counter in advance, so that this edge is first acted upon by the skiving-knife and a perfect edge produced. The counter is always placed in the shoe with the upper edge extending to a certain point in the upper, the lower edge being folded over the heel portion of the sole. If the counter is perfect from the upper edge to the point where it is folded over the heel of the sole, it is immaterial whether the lower edge is skived to a long thin edge or not, as this edge is lasted in and cannot interfere with the appearance or wearing qualities of the shoe.

By arranging the die longitudinally of the roller the side of the blank which forms the upper edge of the counter can be presented first to the knife, and thus this edge is skived properly, and as the blank is advanced toward the knife a counter of the exact shape of the die will be produced, except as to its lower edge, regardless of the stretch of the material. If the material stretches to any appreciable extent, a thin edge will be produced, extending beyond that portion of the counter which is the exact shape of the die; but this edge, as has been stated, is lasted in during the manufacture of the shoe, and the counter is for all practical purposes perfect.

In connection with the mechanism above referred to I provide a feeding mechanism for feeding the blanks sidewise to the die-roller and pressure device, said mechanism being so constructed and timed with relation to the other parts of the machine that the blanks will be presented to the die-roller so as to register with the die. The mechanism which I prefer to employ for this purpose comprises a feed-table extending in close proximity to the line of contact of the die-roller and pressure device, a hopper above said table provided with a flange also extending in close proximity to the line of contact of the die-roller and pressure device, a feed-slide movable over said table and beneath the hopper provided with an opening adapted to engage one side and both ends of the blank, the table and flange forming guides above and below the blank and the sides of the opening in the feed-slide forming guides for the ends of the blank in its passage to the die-roller.

The mechanism above referred to forms a reliable and efficient means for feeding the blanks sidewise to the rollers; but it is to be understood that other means might be provided without departing from the spirit of this portion of my invention.

I believe that I am the first to provide a counter-skiving machine with a die-roller having a die arranged longitudinally thereof; and my invention therefore consists in a die-roller provided with a die extending longitudinally thereof and a pressure device for holding a counter-blank in the die.

I believe that I am the first to combine in a counter-skiving machine a die-roller provided with a die arranged longitudinally thereof and a feed mechanism for feeding a counter-blank sidewise to the die-roller; and my invention therefore also consists in a die-roller provided with a die extending longitudinally thereof, a pressure device for holding a counter-blank in the die, and a feed mechanism for feeding a blank sidewise to the rollers.

My invention also consists in the devices and combinations of devices hereinafter described and claimed.

A preferred form of my invention is illustrated in the accompanying drawings, in which—

Figure 1 is a plan view of a machine embodying the same. Fig. 2 is a central longitudinal sectional view of the machine shown in Fig. 1. Fig. 3 is a transverse sectional view of the machine on a plane passing through the die and pressure rollers. Fig. 4 is a detail view showing the die and pressure rollers detached with a counter-blank in position between the rollers. Fig. 5 is a view in end elevation of one of the sleeves at the ends of the die-roller, and Fig. 6 is a view in side elevation of the same. Fig. 7 is a view in end elevation of one of the sleeves at the ends of the pressure-roller. Fig. 8 is a view in side elevation of the same. Fig. 9 is a rear end view of the feed-slide and its carriage. Fig. 10 is a view in side elevation thereof; and Fig. 11 is a partial plan view similar to Fig. 1, portions of the pressure-roller, hopper, and guard-plate being broken away to show underlying parts and a blank being shown in position in the blank-carrier of the feed-slide.

Referring to the drawings, in which like characters of reference indicate like parts, 1 indicates the frame of the machine, of any suitable construction for supporting the operating parts, and 2 a shaft or stud rigidly secured in a hole in the frame by means of a screw 3 and extending horizontally therefrom.

4 indicates a driving-pulley loosely mounted upon the outer end of the shaft 2, and 5 a pinion loosely mounted on the shaft 2 between the pulley 4 and the frame. The pulley 4 and the pinion 5 are provided with clutching projections, and the pinion 5 is adapted to be moved longitudinally on the shaft 2 to engage and disengage the clutching members by means of a lever 6, pivoted to a bracket extending from the frame of the machine and provided with a roller stud or projection 7, engaging a grooved collar 8, secured to or formed integral with the pinion 5. The pinion 5 meshes with the large gear-wheel 9, secured, as will be described, to the outer end of a short shaft 11, mounted in a bearing in the upper portion of the machine-frame. The shaft 11 is provided with a flange 12 at its inner end, and secured to the shaft between the gear-wheel 9 and the shaft-bearing is a pinion 13, said pinion bearing against a shoulder formed on the shaft and the shaft being held from longitudinal movement in its bearing by means of the pinion and the flange 12. The inner end of the shaft 11 is bored axially, so that the inner end of the shaft forms a sleeve, and into this sleeve extends the inner end of the shaft 14 of the die-roller. The inner end of the shaft 14 has a screw-threaded engagement with the sleeve formed by the inner end of the shaft 11, said screw-threaded engagement, as shown, consisting of a screw-threaded rod 15, extending axially through the shaft 11 and into the sleeve at the inner end of the shaft, the inner end of the rod screwing into a threaded hole in the end of the shaft 14. A washer 16 is situated between the head of the rod 15 and the hub of the gear 9, the rod 15 and washer 16 serving to force the gear 9 against the pinion 13 and the pinion against the shoulder of the shaft 11. A screw 10 passes through the hub of the gear 9 and through the shaft 11 and bears against the rod 15, thereby serving to lock the rod in position. The outer end of the shaft 14 is supported in a sleeve 17, journaled in a bearing in the upper portion of the frame and provided with a flange 18, which bears against the side of the bearing for the sleeve and prevents outward movement of the sleeve.

19 designates the die-roller, loosely journaled on the shaft 14 between the flanges 12 and 18.

In the construction above described it will be seen that the shaft 11 is positively rotated from the pinion 5 through the gear 9, and for connecting the die-roller 19 to the shaft 11 to cause it to rotate therewith and also to cause the sleeve 17 to rotate with the die-roller I provide the sleeves 12 and 18 with suitable projecting lugs 20, adapted to engage notches 21 in the ends of the die-roller. When the shaft 14 is in the position shown in Fig. 3, a flange at the outer end of the shaft bears against the outer end of the sleeve 17 and forces the sleeve against the die-roller and the die-roller against the flange 12, the sleeve 17, the die-roller, and the shafts 14 and 11 being locked together and rotated in unison. The shaft 14 can, however, be rotated independently of the shaft 11, die-roller 19, and sleeve 17 to disconnect it from the shaft 11, and for so rotating it a knob 22 is provided at the outer end of the shaft. By means of this knob the shaft 14 is rotated to disconnect the screw connection with the sleeve at the inner end of the shaft 11 and the shaft withdrawn, leaving the shaft 11 and sleeve 17 in place and allowing the removal of the die-roller. To prevent the die-roller from dropping out of the machine except when the roller and sleeves are in a certain position, the ends of the roller are reduced and the sleeves 18 are provided with semicircular flanges 23, engaging the reduced ends of the roller.

The pressure device which I have shown in the drawings for coöperating with the die-roller 19 consists of a pressure-roller 24, herein shown as a sleeve provided with flanges at both ends and having a covering of flexible or yielding material, such as rubber. The pressure-roller is mounted loosely upon a shaft 25, supported at its outer end in the sleeve 26, journaled in the frame above the sleeve 17, and at its inner end extending into a sleeve 27, formed by axially boring the short shaft 28, journaled in the frame of the machine above the shaft 11. The inner end of the shaft 25 has a screw-threaded engagement with the sleeve 27, similar to the screw-threaded engagement between the shaft 14 and sleeve at the inner end of the shaft 11, said screw-threaded engagement, as shown, consisting of the screw-threaded rod 29, extending axially through the shaft 28 and screwing into a threaded hole in the end of the shaft 25. The rod 29 is locked in position by means of a pin 30, passing through the head of the rod and into the end of the shaft 28.

For causing the pressure-roller to rotate with the die-roller the shaft 28 is provided with a pinion 31, meshing with the pinion 13 on the shaft 11. The sleeves 26 and 27 are provided with flanges, between which the pressure-roller 24 is supported on the shaft 25. For causing the pressure-roller to rotate with the sleeve 27 and the sleeve 26 to rotate with the pressure-roller the sleeves are provided with projecting lugs 32, which engage notches 33 in the flanges at the ends of the pressure-roller. The shaft 25 is locked to the sleeve 27 by means of the screw-threaded engagement therewith during the operation of the machine, but can be rotated independently of the sleeves 26 and 27 and the pressure-roller and be removed, leaving the sleeves 26 and 27 in place, in the same manner as the die-roller shaft 14, thereby allowing the removal of the pressure-roller.

Referring to Figs. 1 and 2, 34 designates the skiving-knife, firmly held to its seat on a transverse portion of the frame by means of the screws 35, passing through slots in the knife and engaging screw-threaded holes in the frame. Screws 36, bearing against the back of the knife, serve as a means for adjusting the knife-edge toward the line of contact of the rollers.

The die for the counter-blank is arranged longitudinally of the axis of the die-roller, and as a consequence it is possible to make the die-roller of small diameter, whereby the cutting edge of the knife can be adjusted close to the surface of the roll, nearly over the center of the roller, and close to the line of contact of the pressure-roller.

The die and pressure rollers are arranged to rotate continuously, and for presenting the blanks to the rollers at the proper time in their revolution to cause the blanks to register with the die in the die-roller I provide a feed mechanism for feeding the blanks sidewise to the rollers, which will now be described.

Mounted on the frame of the machine at the side of the die and pressure rollers opposite to the skiving-knife is a table 37, the upper surface of which is horizontal and on a plane with the bottom of the die in the die-roller. The front end of this table is cut away to conform to the die-roller and extends in close proximity to the surface of the roller. A blank-receiving hopper 38 is secured to the frame of the machine above the plate 37, said hopper consisting of front and end walls shaped to fit the counter-blanks. The front wall of the hopper is provided at its lower end with a horizontally-projecting flange 39, which extends parallel with the upper surface of the table 37 in close proximity to the rollers. The hopper, comprising the front and end walls and flange, is preferably cast in a single piece and is adjustably secured to the frame, so as to be capable of being raised and lowered to suit different thicknesses of blanks, by means of the screw-bolts 40, passing through slots formed in flanges projecting from the hopper and screwing into those portions of the frame which form bearings for the sleeves 26 and 27, as shown in Figs. 2 and 3.

Arranged to reciprocate over the table 37 and beneath the hopper 38 is a feed-plate 41, provided with an opening in its forward end shaped to fit the rear edge of a blank and to engage both ends of the blank. This opening constitutes a blank-carrier, the shape of which is shown in dotted lines in Fig. 1, in which it will be seen that those portions of the opening which engage the ends of the blank are straight and parallel and are thereby adapted to act as guides for the ends of the blanks in passing from the carrier to the rollers.

The rear wall of the hopper 38 is open, and to prevent the lowermost blank in the hopper being displaced by the feed-slide during its backward movement a guard-plate 42 is provided adjustably secured to the frame of the machine by means of screws 43 passing through slots in the plate and extending across the rear of the hopper just above the feed-plate. In addition to acting as a guard for preventing the displacing of the blanks by the feed-slide the plate 42 also serves as a support or table, upon which the blanks may be piled preparatory to placing them in the hopper. As a means for actuating the feed-plate 41 it is secured to a carriage 70, arranged to reciprocate in suitable guideways in the frame of the machine, the actuating means for the carriage 70 consisting of the link 43, connecting the carriage with the forked arm 44, the split sleeve of which is secured to a shaft 45 by means of the clamping-screw 46 and pin 47, the shaft 45 being provided with an arm 48, provided with a roller stud or projection engaging a cam-groove 49 in the face of the gear-wheel 9. The feed-plate 41 is secured to its carriage by means of a screw 50 passing through a slot in the plate and screwing into the carriage. Screws 51, passing through a vertical flange at the rear end of the carriage, bear against the rear edge of the plate 41. By means of this construction the plate 41 can be adjusted on its carriage toward and from the die and pressure rollers to cause the forward ends of the blanks fed by the feed-slide to register with the front edge of the die.

The operation of the machine above described is as follows: A pile of blanks is placed in the hopper 38 and pressed down against the feed-table 37, the downward feed of the pile of blanks being readily accomplished by the operator, as on account of the open rear side of the hopper any blank in the pile can be reached and adjusted if out of position. The feed-slide 41 is moved forward by the mechanism hereinbefore described and carries with it the lowermost blank of the pile seated in the carrier at the front end of the slide. The space between the table 37 and flange 38 is of a width to permit but one blank passing therethrough at a time, the next to the bottom blank being stopped by the front wall of the hopper. In its passage to the rollers the table 37 and flange 39 act as guides above and below the blank and cause the blank to be fed directly between the rollers and to be deposited in the die. During the forward movement of the feed-slide the blank is seated in the carrier and held from lateral displacement, and when the slide reaches its forward position it remains stationary while the blank is being fed therefrom through the rollers, the carrier engaging the ends of the blank and acting as guides therefor. On the return movement of the feed-plate the bottom blank in the hopper is held from movement by the guard-plate 42 until the carrier passes below the blank, when it falls into the carrier in position to be carried forward at the next movement of the feed-slide. As the diameter of the die-roller is small, the blank will have to be bent longitudinally of the roller only to cause it to enter the die, and as the die extends longitudinally of the roller the bend of the blank will be in the direction of its length. The blank can thus be easily forced into the die and seated against the bottom thereof, the die being so shallow relatively to its length that the blank in practice falls into the die of its own weight, the pressure-roller merely serving to hold the blank firmly seated against the bottom of the die. As the blank enters between the rollers it is gripped and fed forward to the skiving-knife, the side of the blank which is to form the upper edge of the counter being presented to the cutting edge first. The blank will thus be skived to a shape corresponding to that of the die, that portion of the blank which is forced into the die being skived exactly true and the portion overlapping the rear edge of the die, due to the stretch of the material being trimmed, to a long thin edge. This edge forms the lower edge of the counter, which is lasted in during the manufacture of the shoe and detracts nothing from the perfection of the counter.

The die and pressure rollers are preferably made of unequal diameter in the construction shown in the drawings the diameter of the pressure-roller being the greater. The rollers travel at the same peripheral speed, this result being accomplished by providing the pinion 31 with one more tooth than the pinion 13. By the above-described arrangement a different portion of the surface of the pressure-roller is caused to register with the die in the die-roller at each revolution of the rollers, and thus the life of the pressure-roller is prolonged.

Having thus described my invention, I claim as new and desire to secure by Letters Patent of the United States—

1. A counter-skiving machine, having, in combination, a die-roller provided with a die-cavity whose greatest length extends longitudinally of the roller, a pressure device, and mechanism for feeding a counter-blank sidewise to the die-roller and pressure device, substantially as described.

2. A counter-skiving machine, having, in combination, a die-roller provided with a die-cavity whose greatest length extends longitudinally of the roller, and a pressure device, substantially as described.

3. A counter-skiving machine, having, in combination, a die-roller provided with a die-cavity whose greatest length extends longitudinally of the roller, a pressure device, and mechanism for feeding a counter-blank sidewise to the die-roller and pressure device comprising a feed-slide provided with a blank-carrier engaging one side and both ends of the blank and forming a guide for the blank in passing to the roller and means for actuating the slide to move the carrier in proximity to the roller, substantially as described.

4. A counter-skiving machine, having, in combination, a die-roller provided with a die-cavity whose greatest length extends longitudinally of the roller, a pressure device, a feed-slide engaging one side of the blank, guides engaging the ends of the blank, and means for actuating the feed-slide, substantially as described.

5. A counter-skiving machine, having, in combination a die-roller, a pressure device, a feed-table extending in close proximity to the line of contact of the die-roller and pressure device, a hopper above said table provided with a flange also extending in close proximity to the line of contact of the die-roller and pressure device, a feed-slide movable over said table beneath the hopper arranged to feed a blank over the table and beneath the flange of the hopper to the die-roller and pressure device, and means for actuating the feed-slide, substantially as described.

6. A counter-skiving machine, having, in combination, a die-roller, a pressure device, a feed-table extending in close proximity to the line of contact of the die-roller and pressure device, a hopper above said table provided with a flange also extending in close proximity to the line of contact of the die-roller and pressure device, a feed-slide movable over said table beneath the hopper provided with a blank-carrier engaging one side and both ends of the blank and forming a guide for the blank in passing to the die-roller, and means for actuating the slide to feed a blank over the table and beneath the flange of the hopper to the die-roller and pressure device, substantially as described.

7. A counter-skiving machine having, in combination, a die-roller, a pressure device, a hopper provided with an open rear side, a guard-plate at the rear of the hopper, a feed-slide movable beneath the hopper and guard-plate, and means for actuating the feed-slide, substantially as described.

8. A counter-skiving machine, having, in combination, a die-roller provided with a die-cavity whose greatest length extends longitudinally of the roller, a pressure device, mechanism for feeding a counter-blank sidewise to the die-roller and pressure device, and guides above and below and at each end of the blank for guiding the blank in its passage to the die-roller and pressure device, substantially as described.

In testimony whereof I affix my signature in presence of two witnesses.

JACOB R. SCOTT.

Witnesses:
ALFRED H. HILDRETH,
FRED O. FISH.